United States Patent
Lee et al.

(10) Patent No.: US 8,804,851 B2
(45) Date of Patent: Aug. 12, 2014

(54) ITERATIVE DETECTION AND DECODING DEVICE FOR SELECTING SOFT INFORMATION ACCORDING TO AT LEAST ONE PREDETERMINED CONSTRAINT RULE, AND RELATED ITERATIVE DETECTION AND DECODING METHOD

(75) Inventors: Yao-Nan Lee, Tainan (TW); Shin-Shiuan Cheng, Tainan (TW)

(73) Assignee: Himax Media Solutions, Inc., Fonghua Village, Xinshi Dist., Tainan (TW)

( * ) Notice: Subject to any disclaimer, the term of this patent is extended or adjusted under 35 U.S.C. 154(b) by 215 days.

(21) Appl. No.: 13/252,212

(22) Filed: Oct. 4, 2011

(65) Prior Publication Data

US 2013/0083871 A1    Apr. 4, 2013

(51) Int. Cl.
  *H04B 1/66* (2006.01)
(52) U.S. Cl.
  USPC .......................................... 375/241; 375/340
(58) Field of Classification Search
  USPC ........................................................ 375/241
  See application file for complete search history.

(56) References Cited

U.S. PATENT DOCUMENTS

| | | | |
|---|---|---|---|
| 6,697,441 B1 * | 2/2004 | Bottomley et al. | 375/340 |
| 8,074,151 B1 * | 12/2011 | Burd et al. | 714/784 |
| 2002/0154712 A1 * | 10/2002 | Cideciyan et al. | 375/341 |
| 2006/0120475 A1 * | 6/2006 | Zhidkov et al. | 375/265 |
| 2007/0155433 A1 * | 7/2007 | Ito et al. | 455/562.1 |
| 2009/0254797 A1 * | 10/2009 | Wu et al. | 714/794 |
| 2011/0214029 A1 * | 9/2011 | Steiner et al. | 714/746 |
| 2012/0051468 A1 * | 3/2012 | Weitkemper et al. | 375/340 |
| 2012/0119928 A1 * | 5/2012 | Yang | 341/94 |

* cited by examiner

*Primary Examiner* — Santiago Garcia
(74) *Attorney, Agent, or Firm* — Winston Hsu; Scott Margo

(57) ABSTRACT

An iterative detection and decoding device includes a signal detector, an error-correction decoder and an SI selector. The signal detector is utilized for generating a set of soft information (SI). The error-correction decoder is coupled to the signal detector, for iteratively decoding the set of SI and accordingly updating the set of SI to generate a set of updated SI. The SI selector is coupled between the signal detector and the error-correction decoder, for selecting at least one SI from the set of updated SI when each SI satisfies at least one predetermined constraint rule. The signal detector further selectively generates a new set of SI according to a selection result generated from the SI selector.

8 Claims, 3 Drawing Sheets

ITERATIVE DETECTION AND DECODING DEVICE FOR SELECTING SOFT INFORMATION ACCORDING TO AT LEAST ONE PREDETERMINED CONSTRAINT RULE, AND RELATED ITERATIVE DETECTION AND DECODING METHOD

BACKGROUND OF THE INVENTION

1. Field of the Invention

The disclosed embodiments of the present invention relate to iteratively decoding soft information, and more particularly, to an iterative detection and decoding device selecting soft information according to predetermined constrained rules, and a related iterative detection and decoding method.

2. Description of the Prior Art

Iterative detection and decoding is a technique that improves the overall performance of a communication system, wherein soft information is exchanged between a signal detector and an error-correction decoder (e.g. a Low-Density Parity-Check decoder) to iteratively derive the desired message. The signal detector can benefit from both the received signal and additional information of the coded bits. Traditionally, all the soft information generated by the decoder is passed to the signal detector regardless of the reliability of the soft information. Although such a scheme is acceptable for most applications, possible decoding failure may still occur, leading to degradation of error-correction performance.

Therefore, how to prevent unreliable soft information from being passed to an error-correction decoder is an issue to be solved in this field.

SUMMARY OF THE INVENTION

In accordance with exemplary embodiments of the present invention, an iterative detection and decoding device for selecting soft information (SI) according to at least one predetermined constraint rule, and a related iterative detection and decoding method, are proposed to solve the above-mentioned problem.

According to a first aspect of the present invention, an exemplary iterative detection and decoding device is disclosed. The exemplary iterative detection and decoding device includes a signal detector, an error-correction decoder and a soft information (SI) selector. The signal detector is utilized for generating a set of soft information (SI). The error-correction decoder is coupled to the signal detector, for iteratively decoding the set of SI and accordingly updating the set of SI to generate a set of updated SI. The SI selector is coupled between the signal detector and the error-correction decoder, for selecting at least one SI from the set of updated SI when each SI satisfies at least one predetermined constraint rule. The signal detector further selectively generates a new set of SI according to a selection result generated from the SI selector.

According to a second aspect of the present invention, an exemplary iterative detection and decoding method is disclosed. The exemplary iterative detection and decoding method includes: generating a set of soft information (SI); iteratively decoding the set of SI and accordingly updating the set of SI to generate a set of updated SI; selecting at least one SI from the set of updated SI when each SI satisfies at least one predetermined constraint rule; and selectively generating a new set of SI according to a selection result of the step of selecting at least one SI from the set of updated SI.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
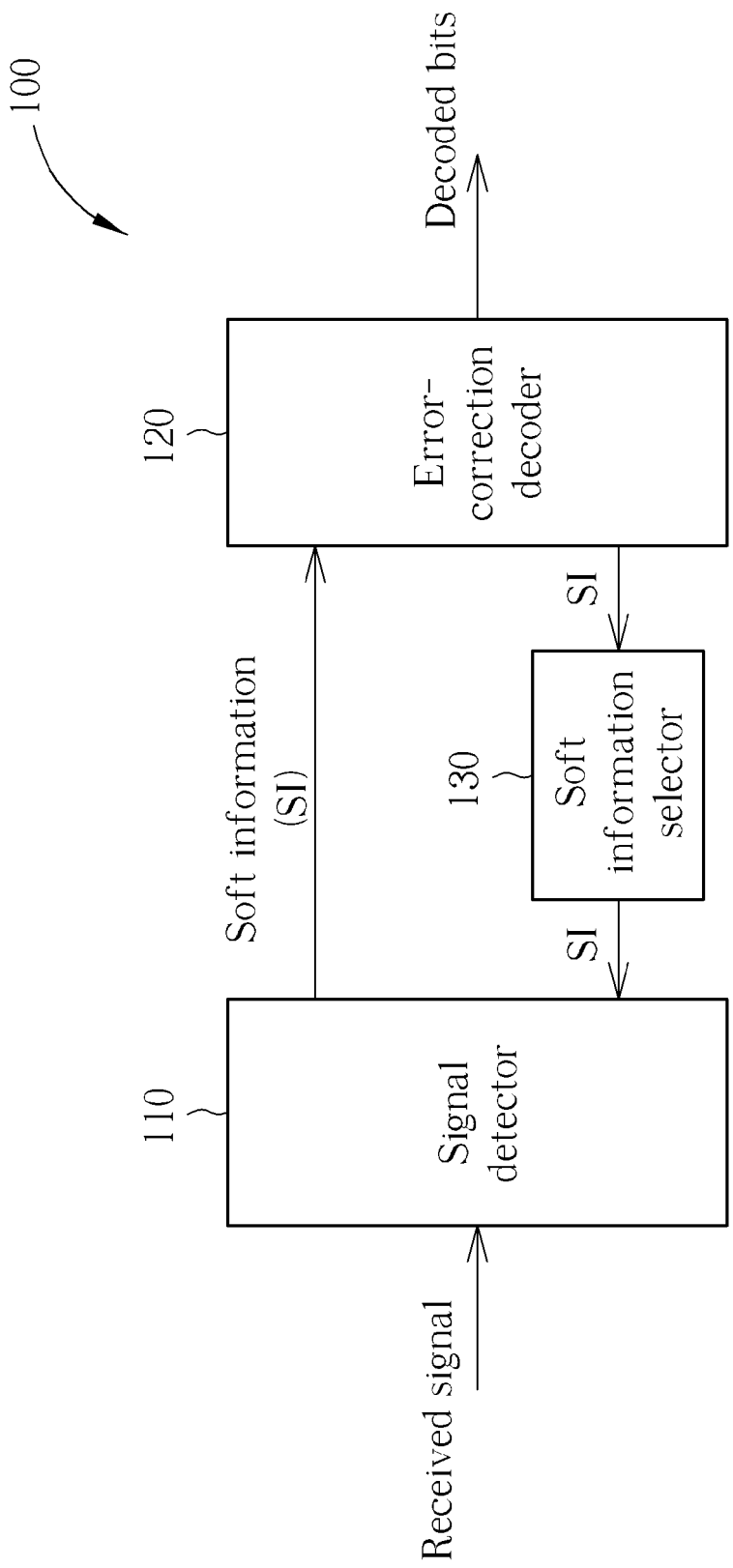
FIG. 1 is a schematic diagram of an iterative detection and decoding device according to an exemplary embodiment of the present invention.

Please refer to FIG. 1, which is a schematic diagram of an iterative detection and decoding device according to an embodiment of the present invention. The iterative detection and decoding device 100 includes, but is not limited to, a signal detector 110, an error-correction decoder 120 and a soft information (SI) selector 130. The signal detector 110 is used for generating a set of SI according to a received signal, wherein each SI included in the set of SI may be a log likelihood ratio of a target bit. Please note this is for illustrative purposes only, and is not a limitation of the present invention. In an alternative design, the implemented SI may be another indicator correlated to the target bit, such as entropy of the target bit. In this embodiment, the error-correction decoder 120 is a low-density parity check (LDPC) decoder, coupled to the signal detector 110, for iteratively decoding the set of SI and accordingly updating the set of SI in order to generate a set of updated SI. The SI selector 130 is coupled between the signal detector 110 and the error-correction decoder 120, and used for selecting at least one SI from the set of updated SI when each SI satisfies at least one predetermined constraint rule. The signal detector 110 further selectively generates a new set of SI according to a selection result generated from the SI selector 130 and the received signal.

Figure 2:
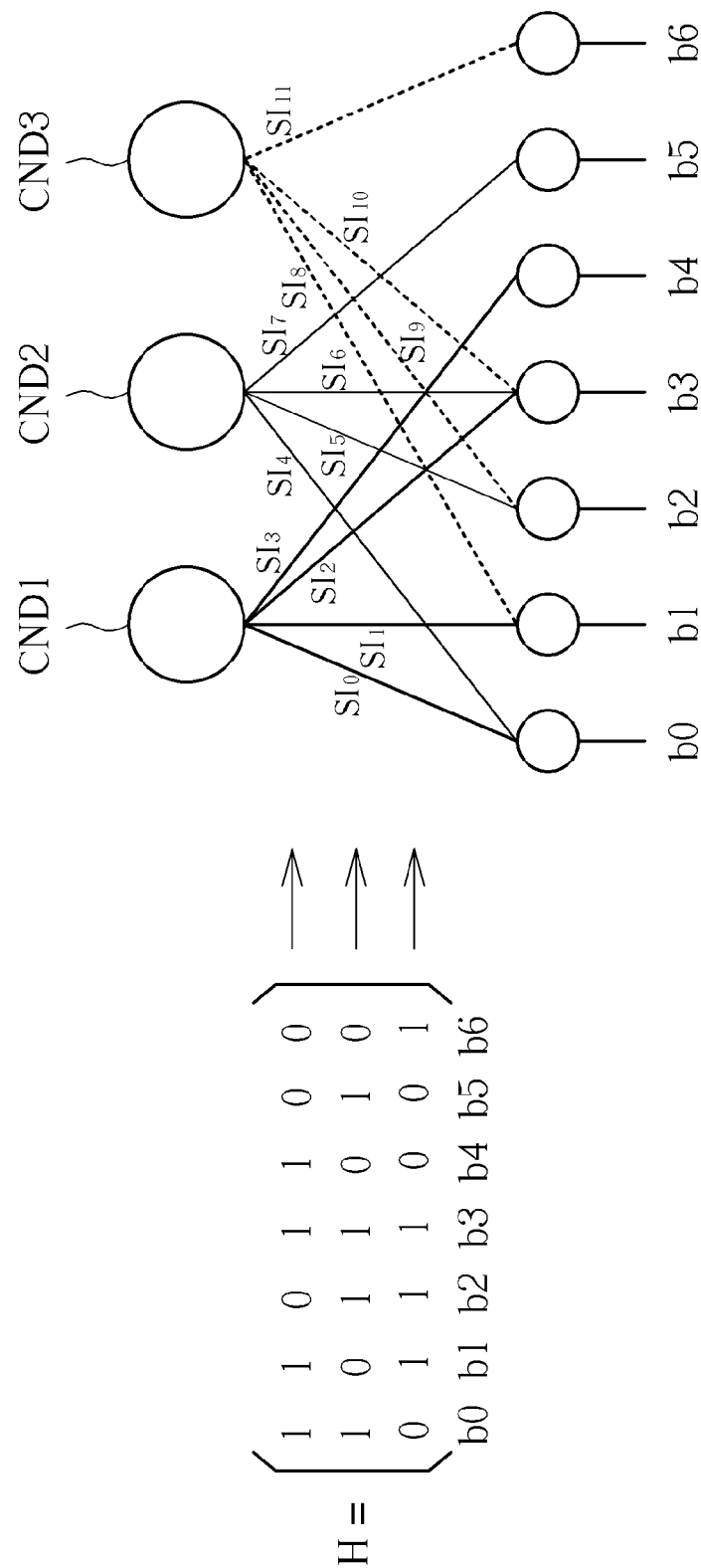
FIG. 2 is a schematic diagram of a partial LDPC coding scheme used by the iterative detection and decoding device shown in FIG. 1.

Please refer to FIG. 2, which is a schematic diagram of a partial LDPC coding scheme used by the iterative detection and decoding device 100 shown in FIG. 1. In FIG. 2, target bits b0-b6 represent the set of SI generated by the signal detector 110, check node detectors CND1-CND3 are check node detectors employed in the error-correction decoder 120, and a matrix H represents an exemplary LDPC parity check matrix for illustration, wherein the number of columns of the matrix H is determined by the number of target bits, and the number of rows of the matrix H is determined by the number of check node detectors. The check node detectors CND1-CND3 first check some of the target bits b0-b6 according to each row of the matrix H, respectively, and then generate an SI corresponding to each target bit checked for iteratively updating the original SI generated by the signal detector 110. The updated SI are then filtered by the SI selector 130 according to the at least one predetermined constraint rule.

In one exemplary design, the predetermined constraint rule defines that a binary summation of hard decisions of SI decoded from a same check node detector of the error-correction decoder 120 should be 0: i.e., an SI is admissible when all SI decoded by the same check node detector are considered reliable. For example, in FIG. 2, the check node detector CND1 first refers to the first row of the matrix H and obtains an array [1, 1, 0, 1, 1, 0, 0], which indicates that only the first, second, fourth and fifth entries of the target bits, i.e., bits b0, b1, b3 and b4, will be checked by the check node detector CND1. The check node detector CND1 checks the bits b0, b1, b3 and b4 according to the first row of the matrix H, and generates corresponding soft information $SI_0$-$SI_3$, respectively. The SI selector 130 then determines whether the binary summation of the hard decisions of soft information $SI_0$-$SI_3$ is 0. If the summation is 0, then the soft information $SI_0$-$SI_3$ are employed by the signal detector 110 to generate a new set of SI; otherwise, the soft information $SI_0$-$SI_3$ are discarded.

In another exemplary design, the predetermined constraint rule defines that hard decisions of SI fed back to a same variable node detector (VND) of the LDPC decoder should be the same: i.e., an SI is admissible when all other SI corresponding to the same target bit are decoded as the same. For example, in FIG. 2, the check node detector CND1 generates soft information $SI_0$-$SI_3$ according to the first row of the matrix H and the check node detector CND2 generates soft information $SI_4$-$SI_7$ according to the second row of the matrix H. The SI selector 130 then determines whether the hard decisions of the soft information $SI_0$ and $SI_4$ are the same. If the hard decisions of the soft information $SI_0$ and $SI_4$ are the same, then the soft information $SI_0$ and $SI_4$ are employed by the signal detector 110 to generate a new set of SI; otherwise, the soft information $SI_0$ and $SI_4$ are both discarded.

Figure 3:
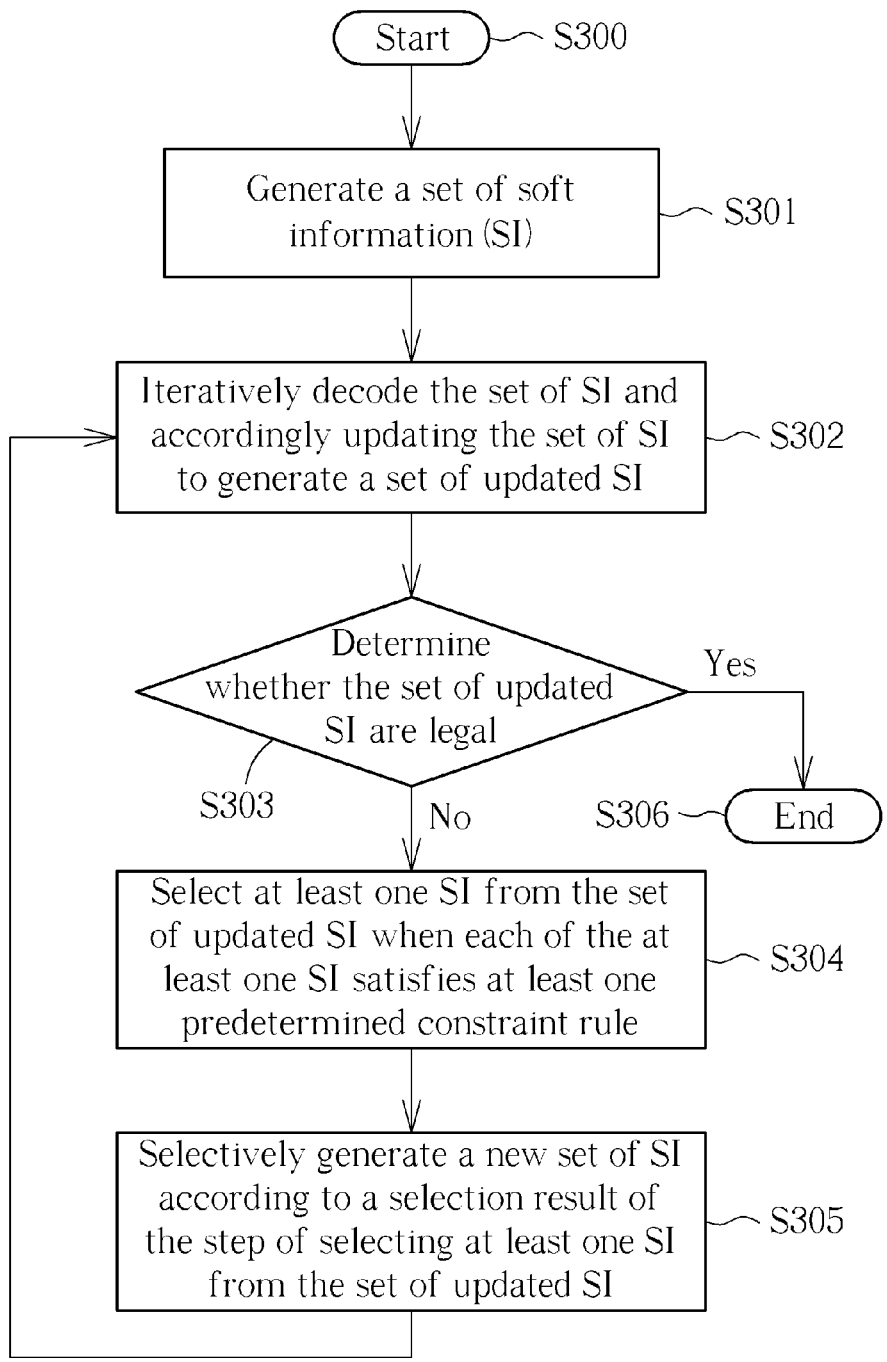
FIG. 3 is a flowchart illustrating an iterative detection and decoding method according to an exemplary embodiment of the present invention.

Further details of technical features of the present invention are described as follows. Please refer to FIG. 3, which is a flowchart illustrating an iterative detection and decoding method according to an embodiment of the present invention. Please note that if the result is substantially the same, the steps are not required to be executed in the exact order shown in FIG. 3. The exemplary iterative detection and decoding method may be employed by the iterative detection and decoding device 100, and may be briefly summarized by the following steps.

Step S300: Start;

Step S301: Generate a set of soft information (SI);

Step S302: Iteratively decode the set of SI and accordingly update the set of SI to generate a set of updated SI;

Step S303: Determine whether the set of updated SI are legal. If the set of updated SI are legal, go to step S306; otherwise, go to step S304;

Step S304: Select at least one SI from the set of updated SI when each SI satisfies at least one predetermined constraint rule;

Step S305: Selectively generate a new set of SI according to a selection result of the step of selecting at least one SI from the set of updated SI, and then go to step S301;

Step S306: End.

The iterative detection and decoding method illustrates the operations of the iterative detection and decoding device 100. As possible modifications can be readily surmised by referring to the detailed description, further description is omitted here for brevity.

To sum up, the present invention introduces a soft information selection mechanism in an iterative decoding loop of an error-correction scheme, which can refine a selection result of decoded soft information, thereby greatly enhancing an error-correction performance.

Those skilled in the art will readily observe that numerous modifications and alterations of the device and method may be made while retaining the teachings of the invention.

What is claimed is:

1. An iterative detection and decoding device, comprising:
a signal detector, for generating a set of soft information (SI);
a low-density parity check (LDPC) decoder which is an error-correction decoder, coupled to the signal detector, for iteratively decoding the set of SI and accordingly updating the set of SI to generate a set of updated SI; and
an SI selector, coupled between the signal detector and the error-correction decoder, for selecting at least one SI from the set of updated SI when a binary summation of hard decisions of SI decoded from a same check node detector (CND) of the LDPC decoder is 0which is a predetermined constraint rule, wherein the signal detector further selectively generates a new set of SI according to a selection result generated from the SI selector.

2. The iterative detection and decoding device of claim 1, wherein each SI included in the set of SI is a log likelihood ratio of a target bit.

3. The iterative detection and decoding device of claim 1, wherein the predetermined constraint rule defines that hard decisions of SI fed back to a same variable node detector (VND) of the LDPC decoder should be the same.

4. An iterative detection and decoding method, comprising:
generating a set of soft information (SI);
iteratively decoding the set of SI by employing a low-density parity check (LDPC) decoding scheme and accordingly updating the set of SI to generate a set of updated SI;
selecting at least one SI from the set of updated SI when a binary summation of hard decisions of SI decoded from a same check node of the LDPC decoding scheme is 0which is a predetermined constraint rule; and
selectively generating a new set of SI according to a selection result of the step of selecting at least one SI from the set of updated SI.

5. The iterative detection and decoding method of claim 4, wherein each SI included in the set of SI is a log likelihood ratio of a target bit.

6. The iterative detection and decoding method of claim 4, wherein the predetermined constraint rule defines that hard decisions of SI fed back to a same variable node of the LDPC decoding scheme should be the same.

7. An iterative detection and decoding device, comprising:
a signal detector, for generating a set of soft information (SI);
a low-density parity check (LDPC) decoder which is an error-correction decoder, coupled to the signal detector, for iteratively decoding the set of SI and accordingly updating the set of SI to generate a set of updated SI; and
an SI selector, coupled between the signal detector and the error-correction decoder, for selecting at least one SI from the set of updated SI when hard decisions of SI fed back to a same variable node detector (VND) of the LDPC decoder is the same and when a binary summation of hard decisions of SI decoded from a same check node detector (CND) of the LDPC decoder is 0, which is a predetermined constraint rule, wherein the signal detector further selectively generates a new set of SI according to a selection result generated from the SI selector.

8. An iterative detection and decoding method, comprising:
generating a set of soft information (SI);
iteratively decoding the set of SI by employing a low-density parity check (LDPC) decoding scheme and accordingly updating the set of SI to generate a set of updated SI;
selecting at least one SI from the set of updated SI when hard decisions of SI fed back to a same variable node of the LDPC decoding scheme is the same and when a binary summation of hard decisions of SI decoded from a same check node detector (CND) of the LDPC decoder is 0; and
selectively generating a new set of SI according to a selection result of the step of selecting at least one SI from the set of updated SI.

* * * * *